(12) United States Patent
Dong et al.

(10) Patent No.: US 11,802,813 B2
(45) Date of Patent: Oct. 31, 2023

(54) DEVICE FOR TESTING NEEDLE ROLLER BEARING OF PLANET GEAR SET AND METHOD THEREOF

(71) Applicant: BEIHANG UNIVERSITY, Beijing (CN)

(72) Inventors: Peng Dong, Beijing (CN); Shumiao Zuo, Beijing (CN); Jiadong Sheng, Beijing (CN); Xiangyang Xu, Beijing (CN); Peter Tenberge, Beijing (CN); Yanfang Liu, Beijing (CN); Shuhan Wang, Beijing (CN); Wei Guo, Beijing (CN); Yan Cheng, Beijing (CN)

(73) Assignee: Beihang University

( * ) Notice: Subject to any disclaimer, the term of this patent is extended or adjusted under 35 U.S.C. 154(b) by 0 days.

(21) Appl. No.: 18/083,440

(22) Filed: Dec. 16, 2022

(65) Prior Publication Data

US 2023/0213409 A1 Jul. 6, 2023

(51) Int. Cl.
*G01M 13/04* (2019.01)
*F16H 57/08* (2006.01)

(52) U.S. Cl.
CPC .......... *G01M 13/04* (2013.01); *F16H 57/082* (2013.01); *F16H 2057/085* (2013.01)

(58) Field of Classification Search
CPC ..................................................... G01M 13/04
See application file for complete search history.

(56) References Cited

U.S. PATENT DOCUMENTS

| | | | |
|---|---|---|---|
| 2014/0046614 A1* | 2/2014 | Pettersson | G01M 13/021 702/113 |
| 2017/0102292 A1* | 4/2017 | Mastro | G01B 7/144 |
| 2019/0063502 A1* | 2/2019 | Lueck | G01D 5/142 |
| 2019/0323814 A1* | 10/2019 | Ji | G01B 5/08 |
| 2020/0224758 A1* | 7/2020 | Piazza | F01M 11/10 |

* cited by examiner

*Primary Examiner* — Alexander A Mercado

(57) ABSTRACT

A device for testing a needle roller bearing of a planet gear set consists of two identical helical planet gear sets, a piston, an end cover, a spindle, and can simulate the actual operating condition of a needle roller bearing of the planet gear set; the rotating speed difference between an inner raceway and an outer raceway of the needle roller bearing is determined by adjusting the rotating speed of a sun gear and a planet carrier; the load on the needle roller bearing includes a centrifugal load and a radial load, and the centrifugal acceleration and the centrifugal load are determined by adjusting the rotating speed of the planet carrier; a method of determining the radial load by adjusting the hydraulic pressure difference of hydraulic chambers at both ends of the piston, generating a tangential force to load the planet gear, and balancing the radial load of the bearing.

6 Claims, 4 Drawing Sheets

DEVICE FOR TESTING NEEDLE ROLLER BEARING OF PLANET GEAR SET AND METHOD THEREOF

TECHNICAL FIELD

The present disclosure relates to the field of needle roller bearing testing design, and in particular relates to a device for testing a needle roller bearing of a planet gear set and a method thereof.

BACKGROUND

A needle roller bearing of a planet gear set is the key part of a planet gear mechanism, and the actual operating condition thereof are complicated and changeable: the rotating speed difference between inner raceway and outer raceway can be huge, and the load can be high. In addition, the bearing bears a very high centrifugal load, which is the most vulnerable part of transmission components. Computer-aided simulation alone is not enough to support theoretical design and large-scale application, so that experimental tests are often required for verification.

It is often difficult for the existing bearing testbed to apply a load, and only the rotating speed characteristics of needle roller bearings are tested. In order to solve this problem, some researchers improved the testbed and applied a radial load by loading the rotation of a screw, in order to study the static characteristics of angular contact ball bearings. Some researchers also applied a load to bearings through compression of springs. In addition, some researchers designed a special bearing testbed for the bearings used in a printing machine. However, all the above methods resulted in a large amount of power loss due to the towing load, and at the same time, a high-power and high-torque motor needs to be equipped, which greatly increases the test cost.

SUMMARY

The present disclosure discloses a device for testing a needle roller bearing of a planet gear set and a method thereof. The testing device consists of two identical helical planet gear sets, a piston, an end cover, a spindle, etc., and can simulate the actual operating condition of a needle roller bearing of a planet gear set. When in use, the rotating speed difference between an inner raceway and an outer raceway of the needle roller bearing is determined by adjusting the rotating speed of a sun gear and a planet carrier; the load on the needle roller bearing comprises a centrifugal load and a radial load, and the centrifugal acceleration and the centrifugal load are determined by adjusting the rotating speed of the planet carrier. The radial load is determined by adjusting the hydraulic pressure difference of hydraulic chambers at both ends of the piston. The testing device of the present disclosure can realize a closed cycle of power flow, and reduce the energy loss of the device. The motor only needs to supplement the power and torque loss of the testing device.

The specific technical scheme of the present disclosure is as follows.

A device for testing a needle roller bearing of a planet gear set is provided, comprising a housing 13, a first planet gear set 1, a second planet gear set 2, a piston 10, an end cover 9, a spindle 3, a test needle roller bearing 12, a first motor and a second motor, wherein all gears of the first planet gear set 1 and the second planet gear set 2 are helical teeth;

wherein a sun gear 5 of the first planet gear set is fixedly connected with the spindle 3, the piston 10 is sleeved on the spindle 3 and is movable along the axial direction of the spindle 3, the piston 10 is connected with the sun gear 5 of the first planet gear set through splines, a sun gear 8 of the second planet gear set is fixedly connected with the piston 10, the end cover 9 is fixedly connected with the spindle 3, a first hydraulic chamber 15 is formed between one end of the piston 10 and the end cover 9, a second hydraulic chamber 16 is formed between the other end of the piston and the spindle, the first planet gear set 1 and the second planet gear set 2 share a gear ring 7 of the planet gear set and a planet carrier 4 of the planet gear set, the test needle roller bearings 12 of the planet gear 6 of the first planet gear set and the planet gear 11 of the second planet gear set are both provided on the planet shaft of the planet carrier 4 of the planet gear set, and the planet gear 6 of the first planet gear set and the planet gear 11 of the second planet gear set are not coaxial;

the first motor and the second motor are connected with the planet carrier 4 of the planet gear set and the spindle 3, respectively, to provide power input.

In another embodiment, the geometric parameters of the first planet gear set 1 and the second planet gear set 2 are the same.

In another embodiment, the housing 13 comprises a housing cover 14.

The present disclosure further provides a testing method based on the device for testing a needle roller bearing of a planet gear set, wherein the centrifugal acceleration $a_a$ of a test needle roller bearing 12 in the actual operating condition is simulated by adjusting the rotating speed $n_1$ of a first motor connected with the planet carrier 4 of the planet gear set:

$$n_1 = \frac{1}{2\pi \cdot i_1} \sqrt{\frac{a_a}{r_c}}$$

where $r_c$ is the radius of the planet carrier of the planet gear set, and $i_1$ is the transmission ratio of the first motor to the planet carrier 4 of the planet gear set.

The present disclosure further provides a testing method based on the device for testing a needle roller bearing of a planet gear set, wherein the rotating speed difference $\Delta n$ between the inner raceway and the outer raceway of the test needle roller bearing 12 in the actual operating condition is simulated by adjusting the rotating speed $n_2$ of a second motor connected with the spindle 3:

$$n_2 = \frac{n_c - \frac{d_p}{d_s}\Delta n}{i_2} = \frac{i_1 n_1 - \frac{d_p}{d_s}\Delta n}{i_2}$$

where $d_s$ and $d_p$ are the pitch diameters of the sun gear of the planet gear set and the planet gear of the planet gear set, respectively, and $i_2$ is the transmission ratio of the second motor to the spindle 3.

The present disclosure further provides a testing method based on the device for testing a needle roller bearing of a planet gear set, wherein the torque difference between the planet carrier 4 of the planet gear set and the spindle 3 is supplemented by adjusting the first motor torque $T_1$ and the second motor torque $T_2$:

$$T_1 = i_1 T_s [1-(1-\zeta_{s\text{-}p})^2(1-\zeta_{r\text{-}p})^2]$$

$$T_2 = -i_2 T_s [1-(1-\zeta_{s\text{-}p})^2(1-\zeta_{r\text{-}p})^2]$$

where $T_s$ is the torque theoretically transmitted by the sun gear of the planet gear set, $\zeta_{s\text{-}p}$ the torque transmission efficiency between the sun gear of the planet gear set and the planet gear, and $\zeta_{r\text{-}p}$ is the torque transmission efficiency between the planet gear of the planet gear set and a gear ring.

The present disclosure further provides a testing method based on the device for testing a needle roller bearing of a planet gear set, wherein the total load F of the test needle roller bearing 12 in the actual operating condition is simulated by adjusting the mass of the planet gear of the planet gear set and the hydraulic pressure of the hydraulic chambers at both ends of the piston 10, and the total load F comprises the centrifugal load and the radial load applied by the planet gear, specifically comprising:

(1) if the centrifugal load is greater than or equal to the required total load F, adjusting the hydraulic pressure of the hydraulic chambers at both ends of the piston 10 to meet the relationship:

$$P_1 A_1 - P_2 P_2 = 0$$

where $A_1$ and $A_2$ are the effective hydraulic action areas of the first hydraulic chamber 15 and the second hydraulic chamber 16, respectively, and $P_1$ and $P_2$ are the hydraulic pressures in the first hydraulic chamber 15 and the second hydraulic chamber 16, respectively;

adjusting the mass $m_p$ of the planet gear of the planet gear set as follows:

$$m_p = \frac{F}{a_a}$$

(2) if the centrifugal load is less than the required total load F, adjusting the hydraulic pressure of the hydraulic chambers at both ends of the piston 10 to meet the relationship:

$$P_1 A_1 - P_2 A_2 = \frac{N \tan\beta}{2} \sqrt{F^2 - (m_p a_a)^2}$$

where $A_1$ and $A_2$ are the effective hydraulic action areas of the first hydraulic chamber 15 and the second hydraulic chamber 16, respectively, $P_1$ and $P_2$ are the hydraulic pressures in the first hydraulic chamber 15 and the second hydraulic chamber 16, respectively, N is the number of planet gears, and $\beta$ is the helical angle;

keeping the mass of the planet gear of the planet gear set unchanged.

Compared with the prior art, the present disclosure has the following beneficial effects.

1. The device for testing a needle roller bearing of a planet gear set of the present disclosure has no power output, the first planet gear set and the second planet gear set can realize a closed cycle of power flow, and the motor only needs to supplement the torque and power lost by the testing device, thus greatly reducing the energy Requirements in the testing process.
2. In the traditional testing device, high power and high torque are required to provide by the motor in order to simulate three parameters, such as centrifugal acceleration, radial load and rotating speed difference between the inner raceway and the outer raceway, of the needle roller bearing of the planet gear set in the gearbox under the actual operating condition, so that the cost is high. Assuming that the power transmission loss between the sun gear and the planet gear of the device for testing a needle roller bearing of a planet gear set of the present disclosure is 1.5%, the power transmission loss between the planet gear and the gear ring is 1.0%, the power demand of the motor connected with the spindle can be reduced by 95% and the power demand of the motor connected with the planet carrier can be reduced by 98%, regardless of the oil loss, the power transmission loss between the spindle, the planet carrier and the motor, etc.
3. The present disclosure drives the piston to drive the sun gear to generate an axial force through hydraulic pressure, and then generates an axial load, which is further converted into a meshing force between gears through helical teeth, thus realizing the loading of the needle roller bearing of the planet gear set. This loading method is convenient to use and is integrated on the spindle of the planet gear set, avoiding the use of external motors.

BRIEF DESCRIPTION OF THE DRAWINGS

In order to explain the specific embodiment of the present disclosure or the technical scheme in the prior art more clearly, the drawings needed in the description of the specific embodiment or the prior art will be briefly introduced hereinafter. Obviously, the drawings in the following description are the implementation process and details of the present disclosure. For those skilled in the art, other drawings can be obtained according to these drawings without paying any creative labor.

DESCRIPTION OF REFERENCE NUMBERS

1—first planet gear set, 2—second planet gear set, 3—spindle, 4—planet carrier of a common planet gear set, 5—sun gear of a first planet gear set, 6—planet gear of a first planet gear set, 7—gear ring of a planet gear set, 8—sun gear of a second planet gear set, 9—end cover, 10—piston, 11—planet gear of a second planet gear set, 12—test needle roller bearing, 13—housing, 14—housing cover, 15—first hydraulic chamber, 16—second hydraulic chamber.

DETAILED DESCRIPTION

In order to understand the above objects, features and advantages of the present disclosure more clearly, the present disclosure will be described in further detail below with reference to the drawings and detailed description. It should be noted that the embodiments of the present disclosure and the features in the embodiments can be combined with each other without conflict.

In the following description, many specific details are set forth in order to fully understand the present disclosure. However, the present disclosure can be implemented in other ways different from those described here. Therefore, the scope of protection of the present disclosure is not limited by the specific embodiments disclosed hereinafter.

In order to facilitate the understanding of the above-mentioned technical scheme of the present disclosure, the above-mentioned technical scheme of the present disclosure will be explained in detail by specific embodiments hereinafter.

Figure 1:
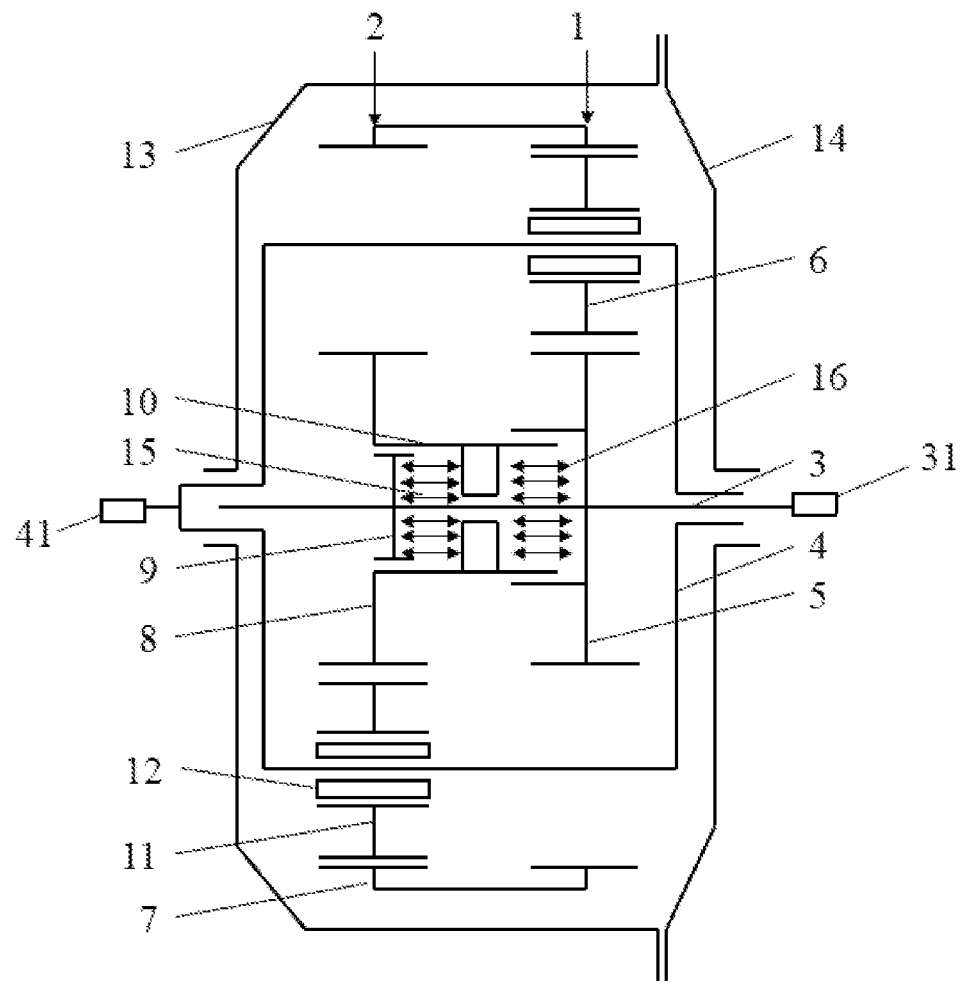
FIG. 1 is a schematic structural diagram of a device for testing a needle roller bearing of a planet gear set according to the present disclosure.
Figure 2:
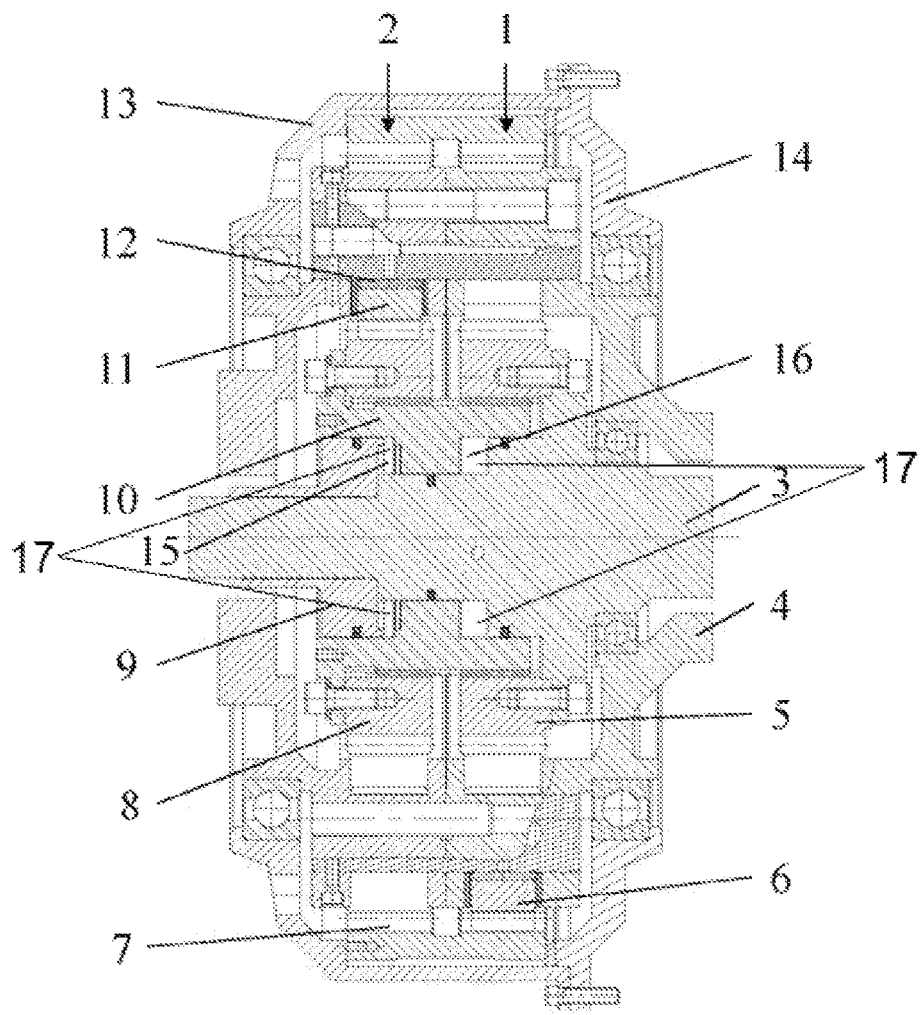
FIG. 2 is a schematic structural diagram of a device for testing a needle roller bearing of a planet gear set according to the present disclosure.

As shown in FIG. 1-2, the present disclosure provides a device for testing a needle roller bearing of a planet gear set, comprising a housing 13, a first planet gear set 1, a second planet gear set 2, a piston 10, an end cover 9, a spindle 3, and a test needle roller bearing 12, wherein the geometric parameters of the first planet gear set 1 and the second planet gear set 2 are the same, and all gears are helical teeth. The connection method is as follows: a sun gear 5 of the first planet gear set is fixedly connected with the spindle 3, the piston 10 is sleeved on the spindle 3 and is movable along the axial direction of the spindle 3, and a sun gear 8 of the second planet gear set is fixedly connected with the piston 10; the piston 10 is connected with the sun gear 5 of the first planet gear set through splines; the end cover 9 is fixedly connected with the spindle 3; the first planet gear set 1 and the second planet gear set 2 share a gear ring 7 of the planet gear set; the first planet gear set 1 and the second planet gear set 2 share a planet carrier 4 of the planet gear set, and three planet gear of the first planet gear sets 6 and three planet gear of the second planet gear sets 11 are circumferentially uniformly distributed on six planet shafts of the planet carrier of a common planet gear set 4 via the test needle roller bearing. The power of the testing device is input through the planet carrier and the spindle 3, and the power is provided by the motor.

A first hydraulic chamber 15 is formed between one end of the piston 10 and the end cover 9, and a second hydraulic chamber 16 is formed between the other end of the piston and the spindle. Moreover, a stable hydraulic pressure difference can be maintained. The piston 10 is subjected to axial hydraulic pressure.

Since the geometric parameters of the first planet gear set 1 and the second planet gear set 2 are the same, and there is no power output, the first planet gear set and the second planet gear set can realize a closed cycle of power flow, and the motor only needs to supplement the torque and power lost by the testing device, thus reducing the energy loss. Assuming that the power transmission loss between the sun gear and the planet gear of the testing device is 1.5%, the power transmission loss between the planet gear and the gear ring is 1.0%, the power demand of the motor connected with the spindle 3 can be reduced by 95% and the power demand of the motor connected with the planet carrier can be reduced by 98%, regardless of the oil loss, the power transmission loss between the spindle 3, the planet carrier and the motor, etc.

The testing device can simulate and test the actual operating condition of the test needle roller bearing of the planet gear set by adjusting the motor speed, the torque and the hydraulic pressure difference between both ends of the piston 10, including the performance in three aspects: the rotating speed difference between the inner raceway and the outer raceway, the centrifugal acceleration and the total load, in which the total load comprises a centrifugal load and a radial load. The implementation principle thereof is as follows:

1. Rotating Speed Difference Between the Inner Raceway and the Outer Raceway

The method for testing the rotating speed difference Δn between the inner raceway and the outer raceway of the needle roller bearing is as follows: the rotating speed ns of the sun gear of two planet gear sets is the same as that of the spindle 3, and is adjusted by the second motor; the rotating speed $n_c$ of the planet carrier of two planet gear sets is adjusted by the first motor; the autorotation speed $n_p$ of the planet gear is defined by the following formula:

$$n_p = -\frac{d_s}{d_p}(n_s - n_c)$$

where $d_s$ and $d_p$ are the pitch diameters of the sun gear and the planet gear, respectively.

The rotating speed difference Δn between the inner raceway and the outer raceway of the test needle roller bearing is obtained by the following formula:

$$\Delta n = n_p = -\frac{d_s}{d_p}(n_s - n_c)$$

2. Centrifugal Acceleration

The method for testing the centrifugal acceleration of the needle roller bearing is as follows: the rotating speed $n_c$ of the planet carrier of the planet gear set is determined by the first motor, and the centrifugal acceleration $a_a$ of the test needle roller bearing is obtained by the following formula:

$$a_a = (2\pi n_c)^2 r_c$$

where $r_c$ is the radius of the planet carrier.

3. Total Load

The total load F of the test needle roller bearing comprises the centrifugal load and the radial load applied by the planet gear, and the relationship thereof is as follows:

$$F_1 = \sqrt{F_c^2 + F_{r1}^2}$$

$$F_2 = \sqrt{F_c^2 + F_{r2}^2}$$

where $F_c$ is the centrifugal load applied to the test needle roller bearing by the planet gear, and $F_{r1}$ and $F_{r2}$ are the radial loads applied to the test needle roller bearing by the planet gears of two planet gear sets, which are equal in magnitude and opposite in direction.

(1) Centrifugal Load

The centrifugal load $F_c$ applied to the test needle roller bearing by the planet gear is obtained by the following formula:

$$F_c = m_p a_a$$

where $m_p$ is the mass of the planet gear.

(2) Radial Load

Figure 3:
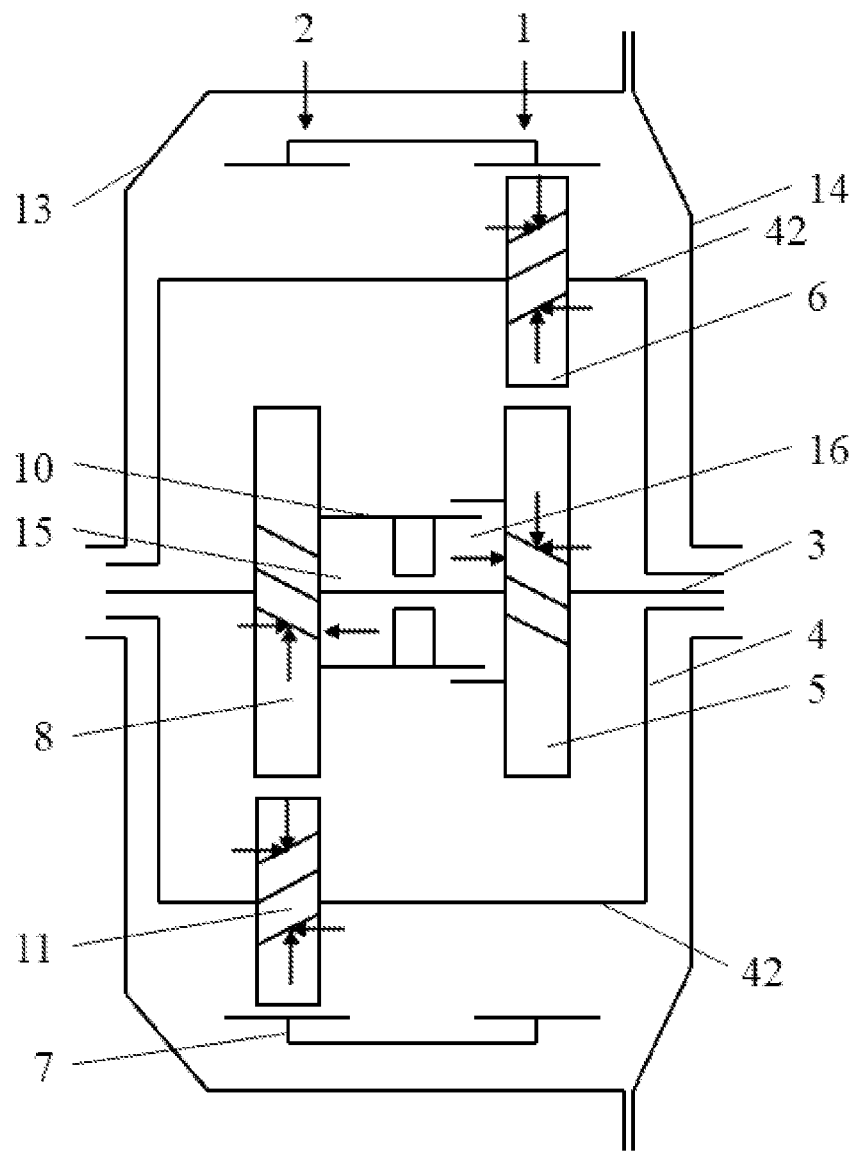
FIG. 3 is a stress analysis diagram of a planet gear set of a device for testing a needle roller bearing of a planet gear set according to the present disclosure.

FIG. 3 is a stress analysis diagram of two planet gear sets. The radial load applied to the test needle roller bearing by the planet gear is determined by the hydraulic pressure of the hydraulic chambers at both ends of the piston. The specific method is as follows.

The hydraulic pressure on the piston is as follows:

$$F_{ap} = P_1 A_1 - P_2 A_2$$

where the effective hydraulic action areas of the first hydraulic chamber and the second hydraulic chamber are $A_1$ and $A_2$, respectively, and the hydraulic pressures thereof are $P_1$ and $P_2$, respectively. Because the piston is fixedly connected with the sun gear of the second planet gear set, the hydraulic pressure $F_{ap}$ on the piston is transmitted to the sun gear of the second planet gear set, and the axial force Fat on the sun gear of the second planet gear set is as follows:

$$F_{a2}=F_{ap}$$

The hydraulic pressure on the end cover is as follows:

$$F_1=-P_1A_1$$

The hydraulic pressure on the spindle is as follows:

$$F_a=P_2A_2$$

Because the end cover is fixedly connected with the spindle, the axial force of the spindle 3 is as follows:

$$F_{as}=P_2A_2-P_1A_1=-F_{ap}$$

The spindle is fixedly connected with the sun gear of the first planet gear set, and the hydraulic pressure $F_{as}$ on the spindle is transmitted to the sun gear of the first planet gear set, so that the axial force $F_{a1}$ of the sun gear of the first planet gear set is as follows:

$$F_{a1}=-F_{ap}$$

Figure 4:
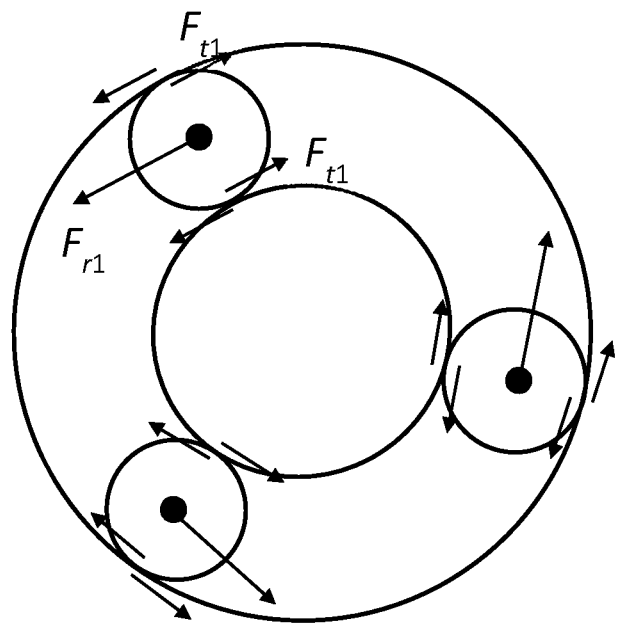
FIG. 4 is a stress analysis diagram of a meshing point of a first planet gear set of a device for testing a needle roller bearing of a planet gear set according to the present disclosure.
Figure 5:
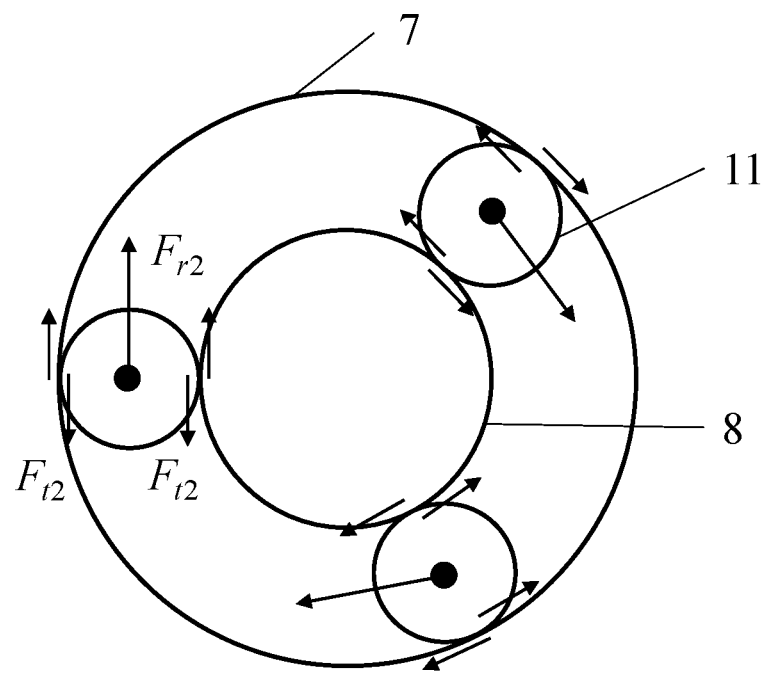
FIG. 5 is a stress analysis diagram of a meshing point of a second planet gear set of a device for testing a needle roller bearing of a planet gear set according to the present disclosure.

FIG. 4 and FIG. 5 are stress analysis diagrams of meshing points of a first planet gear set and a second planet gear set, respectively. In order to keep the stress of the sun gear balanced, the meshing force between the sun gear and the planet gear is equal to the axial force of the sun gear, and the tangential forces of the planet gears of the first planet gear set and the second planet gear set are as follows:

$$F_{t1}=\frac{F_{a1}}{N\tan\beta}=-\frac{F_{a2}}{N\tan\beta}=-F_{t2}$$

The radial load applied to the test needle roller bearing by the planet gears of the first planet gear set and the second planet gear set is as follows:

$$F_{r1}=2F_{t1}=-2F_{t2}=F_{r2}$$

so that:

$$F_{r1}=2\frac{P_2A_2-P_1A_1}{N\tan\beta}=-F_{r2}$$

where N is the number of planet gears, and $\beta$ is the helical angle.

According to the required radial load and the effective hydraulic action area, the hydraulic pressures $P_1$ and $P_2$ of the hydraulic chambers at both ends of the piston are determined.

The testing method using the testing device of the present disclosure is as follows.

S1, the rotating speed of the motor connected with the planet carrier is adjusted.

According to the centrifugal acceleration $a_a$ required for the test needle roller bearing, the rotating speed $n_c$ of the planet carrier of the planet gear set is determined, and then the rotating speed $n_1$ of the first motor is adjusted as follows:

$$n_1=\frac{1}{2\pi\cdot i_1}\sqrt{\frac{a_a}{r_c}}$$

S2, the rotating speed of the motor connected with the spindle is adjusted.

According to the rotating speed difference $\Delta n$ between the ring inner and the outer raceway required for the test needle roller bearing, the rotating speed ns of the spindle is determined, and then the rotating speed $n_2$ of the second motor is adjusted as follows:

$$n_2=\frac{n_c-\frac{d_p}{d_s}\Delta n}{i_2}=\frac{i_1n_1-\frac{d_p}{d_s}\Delta n}{i_2}$$

S3, the first motor torque $T_1$ and the second motor torque $T_2$ are adjusted.

According to the torque difference between the planet carrier of the planet gear set and the spindle 3, the first motor torque $T_1$ and the second motor torque $T_2$ are adjusted:

$$T_1=i_1T_s[1-(1-\zeta_{s\text{-}p})^2(1-\zeta_{r\text{-}p})^2]$$

$$T_2=-i_2T_s[1-(1-\zeta_{s\text{-}p})^2(1-\zeta_{r\text{-}p})^2]$$

where $T_s$ is the torque theoretically transmitted by the sun gear of the planet gear set, $\zeta_{s\text{-}p}$ is the torque transmission efficiency between the sun gear of the planet gear set and the planet gear, and $\zeta_{r\text{-}p}$ is the torque transmission efficiency between the planet gear of the planet gear set and a gear ring.

S4, the mass of the planet gear and the hydraulic pressure of the hydraulic chamber at both ends of the piston are adjusted.

According to the total load F required for test needle roller bearing, the mass of the planet gear and the hydraulic pressure of the hydraulic chamber at both ends of the piston are adjusted.

In the operation of the testing device, there are the following two situations.

(1) if the centrifugal load is greater than or equal to the required total load $F(F_1, F_2)$, the hydraulic pressure of the hydraulic chambers at both ends of the piston should be adjusted to meet the relationship:

$$P_1A_1-P_2A_2=0$$

At the same time, the mass of the planet gear is adjusted as follows:

$$m_p=\frac{F}{a_a}$$

(2) if the centrifugal load is less than the required total load F, the hydraulic pressure of the hydraulic chambers at both ends of the piston should be adjusted to meet the relationship:

$$P_1A_1-P_2A_2=\frac{N\tan\beta}{2}\sqrt{F^2-(m_pa_a)^2}$$

At the same time, the mass of the planet gear remains unchanged.

The above-mentioned embodiments are only preferred embodiments of the present disclosure, and do not limit the present disclosure in any form. All of the possible changes, modifications or amendments made to the technical scheme of the present disclosure by those skilled in the art using the technical content disclosed above without departing from the scope of the technical scheme of the present disclosure are equivalent embodiments of the present disclosure. Therefore, all equivalent changes made according to the idea of the present disclosure without departing from the content of the technical scheme of the present disclosure shall be covered in the scope of protection of the present disclosure.

What is claimed is:

1. A device for testing a needle roller bearings in a planet gear set, comprising a housing (13), a first planet gear set (1), a second planet gear set (2), a piston (10), an end cover (9), a spindle (3), the needle roller bearings (12) to be tested, a first motor (41) and a second motor (31), wherein all gears of the first planet gear set (1) and the second planet gear set (2) have helical teeth;

wherein a sun gear (5) of the first planet gear set (1) is fixedly connected with the spindle (3), wherein the piston (10) is sleeved on the spindle (3) and is capable of moving along the axial direction of the spindle (3), wherein the piston (10) is connected with the sun gear (5) of the first planet gear set (1) through splines, wherein a sun gear (8) of the second planet gear set (2) is fixedly connected with the piston (10), wherein the end cover (9) is fixedly connected with the spindle (3), wherein a first hydraulic chamber (15) is formed between one end of the piston (10) and the end cover (9), wherein a second hydraulic chamber (16) is formed between another end of the piston and the spindle, wherein the first planet gear set (1) and the second planet gear set (2) share a gear ring (7) and a planet carrier (4), wherein the needle roller bearings (12) of the planet gear (6) of the first planet gear set (1) and the planet gear (11) of the second planet gear set (2) are both provided on planet shafts (42) of the planet carrier (4), and wherein the planet gear (6) of the first planet gear set (1) and the planet gear (11) of the second planet gear set (2) are not coaxial;

wherein the first motor (41) and the second motor (31) are connected with the planet carrier (4) and the spindle (3), respectively;

wherein structures of all needle roller bearings (12) of the planet gear (6) of the first planet gear set (1) and all needle roller bearings (12) of the planet gear (11) of the second planet gear set (2) are the same, structures of the sun gear (5) of the first planet gear set (1) and sun gear (8) of the second planet gear set (2) are the same, structures of the planet gear (6) of the first planet gear set (1) and the planet gear (11) of the second planet gear set (2) are the same.

2. The device for testing the needle roller bearings in the planet gear set according to claim 1, wherein the housing (13) further comprising a housing cover (14).

3. A testing method based on the device for testing the needle roller bearings in the planet gear set according to claim 1, $a_a$ comprising:

determining a centrifugal acceleration $a_a$ of the needle roller bearing (12) under actual operating condition, calculating a rotating speed $n_1$ according to the formula:

$$n_1 = \frac{1}{2\pi \cdot i_1} \sqrt{\frac{a_a}{r_c}},$$

adjusting a rotating speed of the first motor (41) connected with the planet carrier (4) to the rotating speed $n_1$ to make a centrifugal acceleration of the needle roller bearing (12) to be the centrifugal acceleration $a_a$;

where $r_c$ is a radius of the planet carrier (4), and $i_1$ is a first transmission ratio of the first motor (41) to the planet carrier (4); wherein the first transmission ratio is a ratio of the rotating speed of the first motor (41) to the planet carrier (4).

4. The testing method according to claim 3, further comprising: determining a rotating speed difference $\Delta n$ between an inner raceway and an outer raceway of the needle roller bearing (12) under actual operating condition, calculating a rotating speed $n_2$ according to the formula:

$$n_2 = \frac{n_c - \frac{d_p}{d_s}\Delta n}{i_2} = \frac{i_1 n_1 - \frac{d_p}{d_s}\Delta n}{i_2},$$

adjusting a rotating speed of the second motor (31) connected with the spindle (3) to the rotating speed $n_2$ to make a rotating speed difference between an inner raceway and an outer raceway of the needle roller bearing (12) to be the rotating speed difference $\Delta n$;

wherein $n_c$ is a rotating speed of the planet carrier (4), $d_s$ is a pitch diameters of the sun gear (5) of the first planet gear set (1) or the sun gear (8) of the second planet gear set (2), $d_p$ is a pitch diameter of the planet gear (6) of the first planet gear set (1) or the planet gear (11) of the second planet gear set (2), respectively, and $i_2$ is a second transmission ratio of the second motor (31) to the spindle (3), wherein the second transmission ratio is a ratio of the rotating speed of the second motor (31) to the spindle (3).

5. The testing method according to claim 4, further comprising: determining a total load F of the test needle roller bearing (12) under actual operating condition; adjusting a mass of the planet gear (6) of the first planet gear set (1), a mass of the planet gear (11) of the second planet gear set (2), and hydraulic pressures of the first hydraulic chamber (15) and the second hydraulic chamber (16) at both ends of the piston (10) to make a total load of the test needle roller bearing (12) to be the total load F; wherein the total load F comprises a centrifugal load and a radial load applied by the planet gear (6) of the first planet gear set (1) or the planet gear (11) of the second planet gear set (2);

wherein adjusting the mass of the planet gear (6) of the first planet gear set (1), the mass of the planet gear (11) of the second planet gear set (2), and the hydraulic pressures of the first hydraulic chamber (15) and the second hydraulic chamber (16) at both ends of the piston (10) to make a total load of the test needle roller bearing (12) to be the total load F, comprising:

(1) if the centrifugal load is greater than or equal to the total load F, adjusting hydraulic pressures of the first hydraulic chamber (15) and the second hydraulic chamber (16) at both ends of the piston (10) to meet the relationship:

$$P_1A_1-P_2A_2=0$$

where $A_1$ and $A_2$ are area values of effective hydraulic action areas (17) of the first hydraulic chamber (15) and the second hydraulic chamber (16), respectively, and $P_1$ and $P_2$ are the hydraulic pressures of the first hydraulic chamber (15) and the second hydraulic chamber (16), respectively;

adjusting the mass of the planet gear (6) of the first planet gear set (1) and the mass of the planet gear (11) of the second planet gear set (2) to meet the relationship:

$$m_p = \frac{F}{a_a}$$

wherein $m_p$ is the mass of the planet gear (6) of the first planet gear set (1) or the mass of the planet gear (11) of the second planet gear set (2);

(2) if the centrifugal load is less than the total load F, adjusting hydraulic pressures of the first hydraulic chamber (15) and the second hydraulic chamber (16) at both ends of the piston (10) to meet the relationship:

$$P_1A_1 - P_2A_2 = \frac{N\tan\beta}{2}\sqrt{F^2 - (m_pa_a)^2}$$

where $A_1$ and $A_2$ are area values of effective hydraulic action areas (17) of the first hydraulic chamber (15) and the second hydraulic chamber (16), respectively, $P_1$ and $P_2$ are the hydraulic pressures of the first hydraulic chamber (15) and the second hydraulic chamber (16), respectively, N is a number of the planet gear (6) of the first planet gear set (1) or the planet gear (11) of the second planet gear set (2), and $\beta$ is a helical angle; keeping the mass of the planet gear (6) of the first planet gear set (1) and the planet gear (11) of the second planet gear set (2) unchanged.

6. The testing method according to claim 3, wherein a torque difference between the planet carrier (4) and the spindle (3) is supplemented by adjusting a first motor torque $T_1$ and a second motor torque $T_2$:

$$T_1 = i_1 T_s [1-(1-\zeta_{s\text{-}p})^2(1-\zeta_{r\text{-}p})^2]$$

$$T_2 = -i_2 T_s [1-(1-\zeta_{s\text{-}p})^2(1-\zeta_{r\text{-}p})^2]$$

where $T_s$ is a torque of the sun gear (5) of the first planet gear set (1) or the sun gear (8) of the second planet gear set (2); $\zeta_{s\text{-}p}$ is a torque transmission efficiency between the sun gear (5) of the first planet gear set (1) and the planet gear (6) of the first planet gear set (1) or the sun gear (8) of the second planet gear set (2) and the planet gear (11) of the second planet gear set (2), and is equal to a ratio of a torque of the sun gear (5) of the first planet gear set (1) to a torque of the planet gear (6) of the first planet gear set (1) or a ratio of a torque of the sun gear (8) of the second planet gear set (2) to a torque of the planet gear (11) of the second planet gear set (2); $\zeta_{r\text{-}p}$ is a torque transmission efficiency between the planet gear (6) of the first planet gear set (1) and the gear ring (7) or the planet gear (11) of the second planet gear set (2) and the gear ring (7), and is equal to a ratio of a torque of the planet gear (6) of the first planet gear set (1) to a torque of the gear ring (7) or a ratio of a torque of the planet gear (11) of the second planet gear set (2) to a torque of the gear ring (7).

\* \* \* \* \*

UNITED STATES PATENT AND TRADEMARK OFFICE
CERTIFICATE OF CORRECTION

| | | |
|---|---|---|
| PATENT NO. | : 11,802,813 B2 | Page 1 of 1 |
| APPLICATION NO. | : 18/083440 | |
| DATED | : October 31, 2023 | |
| INVENTOR(S) | : Dong et al. | |

It is certified that error appears in the above-identified patent and that said Letters Patent is hereby corrected as shown below:

On the Title Page

Item (72) "Inventors", Line 4, after "Tenberge," delete "Beijing (CN);" and insert -- Bochum (DE); --, therefor.

Signed and Sealed this
Seventeenth Day of September, 2024

Katherine Kelly Vidal
*Director of the United States Patent and Trademark Office*